(12) United States Patent
Olivé

(10) Patent No.: US 11,543,348 B2
(45) Date of Patent: Jan. 3, 2023

(54) CONDENSATION PREVENTION IN AN ASPIRATING SMOKE DETECTION SYSTEM

(71) Applicant: Carrier Corporation, Palm Beach Gardens, FL (US)

(72) Inventor: Pere Moix Olivé, Barcelona (ES)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

(21) Appl. No.: 17/132,799

(22) Filed: Dec. 23, 2020

(65) Prior Publication Data

US 2021/0349020 A1  Nov. 11, 2021

(30) Foreign Application Priority Data

May 8, 2020  (EP) ..................... 20382380

(51) Int. Cl.
*G01N 21/53* (2006.01)

(52) U.S. Cl.
CPC ... *G01N 21/532* (2013.01); *G01N 2201/0238* (2013.01)

(58) Field of Classification Search
CPC ............... G01N 21/532; G01N 2201/0238
USPC ....................................... 356/343, 437–438
See application file for complete search history.

(56) References Cited

U.S. PATENT DOCUMENTS

| | | |
|---|---|---|
| 4,897,634 A | 1/1990 | Sawa et al. |
| 5,381,130 A | 1/1995 | Thuillard et al. |
| 5,519,490 A | 5/1996 | Nakata et al. |
| 6,377,183 B1 | 4/2002 | Baker et al. |
| 6,756,905 B2* | 6/2004 | Rattman ............... G08B 29/183 340/630 |
| 7,301,640 B2 | 1/2007 | Tice |
| 10,054,542 B2* | 8/2018 | Iguchi ..................... G01N 21/53 |
| 2005/0179904 A1 | 8/2005 | Larsen et al. |
| 2006/0139647 A1* | 6/2006 | Tice ........................ G01N 21/15 356/437 |
| 2013/0031957 A1 | 2/2013 | Shaw et al. |
| 2018/0180540 A1* | 6/2018 | Iguchi ..................... G01N 21/53 |

FOREIGN PATENT DOCUMENTS

| | | |
|---|---|---|
| CN | 206684890 U | 11/2017 |
| DE | 102004032294 A1 | 2/2006 |
| EP | 0838794 B1 | 12/2003 |
| EP | 1868173 A2 | 12/2007 |
| EP | 3327688 A1 | 5/2018 |
| JP | 10063965 A2 | 6/1998 |
| JP | 2003141654 A2 | 5/2003 |

OTHER PUBLICATIONS

European Search Report for European Application No. 20382380.2, dated Oct. 27, 2020, 8 pages.

* cited by examiner

*Primary Examiner* — Isiaka O Akanbi
(74) *Attorney, Agent, or Firm* — Cantor Colburn LLP

(57) ABSTRACT

A smoke detector for an aspirating smoke detection system includes a housing that defines a detection chamber, wherein the housing includes a metallic layer optically exposed to the detection chamber; a laser arranged to direct a beam of light through the detection chamber; a photodiode arranged to detect light scattered from the beam of light; and a heater positioned proximate the metallic layer and outside of the detection chamber, wherein the metallic layer is configured to conduct heat from the heater.

13 Claims, 2 Drawing Sheets

CONDENSATION PREVENTION IN AN ASPIRATING SMOKE DETECTION SYSTEM

CROSS REFERENCE TO RELATED APPLICATIONS

This application claims the benefit of European Application No. 20382380.2 filed May 8, 2020, the disclosure of which is incorporated herein by reference in its entirety.

BACKGROUND

The present invention relates to reducing the formation of condensation within a detector unit of an aspirating smoke detection system.

An aspirating smoke detection system is a system used in active fire protection, comprising a central detector unit which draws air from a room which is being monitored through a network of pipes. Aspirating smoke detection systems can detect smoke long before it is visible to the naked eye, and thus such systems are often referred to as high sensitivity smoke detectors (HSSDs).

In most cases the aspirating smoke detection system comprises a fan unit or blower that is used to draw in air from the monitored area through the network of pipes. A portion of this air (typically around 10%) is then passed into a sampling chamber of the central detector unit where it is used to determine whether or not smoke is present. The sampling chamber is typically part of a nephelometer that detects the presence of smoke particles suspended in air by detecting the light scattered by the smoke particles in the chamber.

A nephelometer measures suspended particulates by directing a light beam (e.g. using a laser) through the sample chamber to a light absorbing receiver positioned opposite in the chamber, which absorbs any light incident upon it. A light detector (e.g. a photodiode) is also positioned in the sampling chamber, typically set to one side of the light beam. The light detector detects light scattered from the light beam by smoke particles present in the air of the sampling chamber. The sampling chamber often has a mirrored interior surface that is arranged to reflect scattered light to the light detector. Particle density can be calculated as a function of the light reflected into the detector from the particles.

During normal operation of an aspirating smoke detection system, the temperature of the detector unit usually remains similar to that of the sample air (i.e. the temperature of the air drawn into the system from a room to be monitored). However, aspirating smoke detection systems often have to deal with a wide range of sample air temperatures, as the temperature of the sample air is directly dependent on the temperature of the room being monitored. When the sample air temperature increases abruptly inside the detector unit, water condenses along the air flow path on the colder components of the system. This becomes problematic in the detector unit and in particular it is problematic inside of the sampling chamber because the transmittal and reflection of light from the light beam is modified (due to the presence of a layer of water and different Fresnel coefficients). This can reduce the accuracy of the reading from the detector unit.

Previously this problem has been overcome by incorporating a heater in the aspirating smoke detection system near the inlet to the central detector unit where air from the monitored area is drawn into the system. Such a heater is often coupled to the fan unit or blower mentioned above to heat the air as it is taken into the unit. As such, the heater heats all of the air taken into the system in order to maintain a substantially constant air temperature (higher than the ambient temperature of the monitored area) and thus avoid or reduce an abrupt change in temperature inside of the detector unit and the resultant formation of condensation. Such a heater typically reduces the flow rate of air through the detection system in order for the air to be heated for a sufficient amount of time.

A need exists for an improved technique to reduce condensation in the central detector unit of an aspirating smoke detection system.

BRIEF DESCRIPTION

In one aspect, the present disclosure provides a smoke detector unit for an aspirating smoke detection system, the smoke detector unit including: a housing that defines a detection chamber, wherein the housing comprises a metallic layer optically exposed to the detection chamber; a laser arranged to direct a beam of light through the detection chamber; a photodiode arranged to detect light scattered from the beam of light; and a heater positioned proximate the metallic layer and outside of the detection chamber, wherein the metallic layer is configured to conduct heat from the heater.

By utilizing a heater proximate to the metallic layer that is exposed to the detection chamber, the metallic layer that forms part of the walls of the detection chamber can be heated more directly to avoid condensation. As a result of the high thermal conductivity of the metallic layer, a substantially even, heated temperature of the layer will be maintained, which prevents condensation from forming on the metallic layer. Furthermore, the metallic layer can conduct the heat efficiently to other parts of the detector unit, including the air in the detection chamber. This prevents the need to heat all of the air being taken into an aspirating heat detector system using a heater coupled to a fan unit as mentioned above. By heating the metallic layer, the amount of energy required to prevent condensation in the detector unit is greatly reduced. Furthermore, the flow rate of air through the detection system does not have to be reduced as all of the air being drawn into the system no longer needs to be heated.

Furthermore, the metallic layer can conduct heat from the heater to other components of the detector unit. This may include the laser, which may ensure the laser is heated to prevent condensation from forming on/within the laser. As such, the metallic layer and laser may be configured to conduct heat from the heater to a lens of the laser, which may prevent or reduce the formation of condensation on the lens and the metallic layer. Condensation on the lenses of the laser is problematic because, due to the nanometre wavelengths of light emitted by the laser, the condensation can cause refraction of the transmitted light from the laser. This can cause light from the laser to be detected as scattered light because it is instead reflected by the metallic layers to the photodetector. This can result in light from the laser being detected as scattered light and a false detection of smoke.

The metallic layer may also be arranged to conduct heat to the entire surface of the metallic layer. Thus, the detection chamber and metallic layer may be evenly heated and condensation on the metallic layer may be reduced or prevented. Condensation on the metallic layer is also significant as this is designed to reflect scattered light to the photodiode and the presence of condensation alters this reflection following similar reasoning as outlined above. This can reduce the effectiveness of the detector unit in detecting scattered light, thus reducing the ability/sensitivity of the detector in detecting smoke.

The detector unit may be arranged to operate as a nephelometer in order to detect the presence of smoke.

The metallic layer may have already been present in a pre-existing detector unit and the heater may be retrofitted to such a pre-exiting detector unit in order to form a detector unit according to the first aspect.

The housing may be formed from two parts, which may comprise a dome, or hemispherical portion and a top portion. The dome portion may be attached to the cover portion so that the housing encloses the detection chamber and the detection chamber may be optically sealed, preventing any light entering from an outside environment.

The dome portion may comprise the metallic layer and the metallic layer may be positioned on an inner surface of the dome portion. The cover portion may also comprise a similar metallic layer on its inner surface. The respective metallic layers of the dome portion and the cover portion may be in contact with one another at a top edge of the detection chamber. The cover portion and dome portion may be formed from a plastic material, with the metallic layer(s) formed thereon. Both the cover portion and dome portion may be thermally conductive.

The metallic layer(s) may be arranged to reflect light scattered from the beam of light to the photodiode.

The laser may be seated within a recess in the top portion. The housing may be configured to conduct heat from the heater to the laser via the metallic layer and the top portion. Alternatively, or additionally, a heater may be adjacent the cover portion or laser and heat may be conducted to the metallic layer.

Any of the components described herein as being fixed to one another, proximate to one another or adjacent to one another may be attached using thermally conductive adhesive.

The detector unit may comprise a receiver arranged to receive light from the laser that is not scattered (i.e. it receives light directly from the laser). The receiver may be a light absorber and may be configured to absorb any light incident upon it. The receiver may be positioned adjacent to an exterior surface of the housing, particularly the dome portion, and may be positioned behind a small hole in the metallic layer. The metallic layer may be configured to conduct heat from the heater to the receiver in order to prevent or reduce the formation of condensation at or on the receiver. It will be appreciated that this is advantageous as condensation on the receiver can also result in a false detection of smoke as this may reflect or scatter light, thus preventing it from being absorbed by the receiver.

The photodiode may be positioned within the detection chamber. The photodiode may be set to one side of the light beam such that it does not receive light emitted directly by the laser. This position of the photodiode may be the optimum positon to detect reflected light from the metallic layer. The metallic layer may be configured to conduct heat from the heater to the photodiode in order to prevent or reduce the formation of condensation at or on the photodiode. It will be appreciated that this is advantageous as condensation on the photodiode can reduce the sensitivity of the photodiode in detecting scattered light.

The heater may comprise a plurality of heating elements, and these elements may be cables or tapes. The heating elements or tapes may be spaced equally apart from one another. Such heaters may provide heat more evenly to the metallic layer.

The heating elements may be extend around at least part of the metallic layer. In the case of the housing comprising a dome portion, the heating elements may be adjacent the dome portion and may extend across at least part of the surface the dome portion. The heating elements may extend around at least part of a circumference of a sector of the dome portion. Such arrangements can heat the metallic layer evenly.

The detector unit may include a temperature sensor for measuring a temperature of one or more components of the detector unit. The heater itself may comprise the temperature sensor. The temperature sensor may be arranged to measure a temperature of the heater, a temperature of air inside of the detection chamber, a temperature of the metallic layer and/or a temperature of the laser. The detector unit may be configured to adjust a heat output of the heater based at least in part on the measured temperature.

More preferably, however, the heater is configured to self-regulate its heating output. As such, the heater may comprise one or more self-regulating heating cables. For example, the heating elements may comprise Positive Temperature Coefficient ("PTC") heating elements. Such heaters self-regulate their power output to maintain a substantially constant temperature and thereby enable effective heat transfer in a small space.

The heater may be configured to maintain any of these temperatures above a predetermined value. For example, the predetermined value may be higher than an expected operating range of air temperatures; in particular, an expected range of air temperatures in a space to be monitored. This may be above 25° C., above 27° C. or even above 30° C.

Alternatively, or additionally, the heater may have its heating output adjusted in any of the ways described herein using a controller.

The detector unit may comprise a blower arranged to draw an air flow from a space to be monitored into the smoke detector unit. The blower may be arranged to divert a portion of the air flow to the detection chamber of the detector unit. The portion of the air flow that is diverted to the detection chamber may be 50% or less of the total air flow drawn from the space to be monitored, 25% or less, 20% or less or even 15% or less. The portion of air flow that is diverted to the sample chamber may be at least 5% of the total air flow drawn from the space to be monitored, or at least 10%.

According to a second aspect, the present disclosure provides an aspirating smoke detection system comprising: the detector unit according to the first aspect, wherein the detector unit comprises a blower arranged to draw an air flow from a space to be monitored into the aspirating smoke detection system; and piping arranged to direct the air flow through the smoke detection system, wherein a portion of the air flow is diverted to the detection chamber of the detector unit.

The piping may comprise an inlet fluidly connected to the space to be monitored. The inlet may comprise a plurality of sampling holes along a length of the piping. The space to be monitored may be a part or all of a building, a vehicle or a room.

The portion of air flow that is diverted to the sample chamber may be 50% or less of the total air flow drawn from the space to be monitored, preferably 25% or less, more preferably 20% or less and even more preferably 15% or less. The portion of air flow that is diverted to the sample chamber may be at least 5% of the total air flow drawn from the space to be monitored, preferably at least 10%. The system may be configured to allow the portion of air to be adjusted.

The detector unit according to the first aspect or the system according to the second aspect may comprise a controller. The controller may be connected to any one or more of the indicators, flow sensors, temperature sensors, heaters or blowers mentioned herein. The controller may be configured to adjust the heat output of the heaters in any manner discussed herein.

The detector unit according to the first aspect or the system according to the second aspect may comprise a buck boost regulator with overcurrent protection and may also comprise a power source. The power source may be a mains power supply, a battery or a capacitor. The power source may be arranged to supply power to the detector unit and/or the controller via the buck boost regulator. The buck boost regulator may function to protect against overcurrent and ensure a stable power supply to the detector unit.

The detector unit according to the first aspect or the system according to the second aspect may comprise a temperature sensor for measuring a temperature of the space to be monitored and the heat output of the heater may be at least in part on this measured temperature.

The detector unit according to the first aspect or the system according to the second aspect may comprise a flow sensor. The flow sensor may measure a flow rate of air drawn into system, through the blower, through the system and/or diverted through the detector unit. The flow sensor may be incorporated into the blower. The heat output of the heater may be adjusted based at least in part on any of the measured flow rates and/or temperatures described herein.

The detector unit according to the first aspect or the system according to the second aspect may comprise an indicator. The indicator may be arranged to indicate to a user any one or a combination of the following: any of the measured temperatures described herein; a heat output of the heater; a presence of condensation; a presence of smoke; or any of the measured rates of air flow described herein.

The detector unit according to the first aspect or the system according to the second aspect may comprise a control panel and/or display for a user to operate the system and adjust the heat output by the heater or to adjust any of the flow rates. The control panel may comprise any of the indicators mentioned above.

The detector unit according to the first aspect or the system according to the second aspect may comprise an alarm that is triggered when smoke is detected.

According to a third aspect, the present invention provides a method of reducing or preventing the formation of condensation within a detector unit of an aspirating smoke detection system, the method comprising: applying heat from a heater to a metallic layer of a detection chamber of the detector unit in order to reduce or prevent the formation of condensation on one or more of the metallic layer and a lens of a laser of the detection unit.

The detector unit may be a detector unit according to the first aspect including any of the optional features described herein.

The method may comprise measuring a temperature of the detector unit, heater, laser, air in the space to be measured, air in the piping and/or air in the detection chamber; and adjusting the output of heat from the heater based at least in part on the measured temperature. The measuring of the temperature(s) may be performed using any of the temperature sensors described above in relation to the first and second aspect.

The method may comprise adjusting the output of heat from the heater based at least in part on any measured temperature described herein. The method may comprise adjusting the output of heat from the heater based at least in part on any measured flow rate described herein. The measuring of flow rate(s) may be performed using any of the flow rate sensors described above in relation to the first and second aspect.

The adjusting of the output of heat from the heater may be carried out automatically. The adjusting of output of heat from the heater may be performed by a self-regulating heater as previously discussed. Alternatively, or additionally, the output of heat from the heater may be performed using the above mentioned controller described in relation to the first and second aspect.

The method may comprise heating the detector unit using the heater to a predetermined temperature. The predetermined temperature may be a temperature higher than that of air in the space to be monitored, or higher than an expected range of temperatures for air in the space to be monitored. For example, if the space to be monitored 104 is a room of a house, the heating cables may be arranged to maintain a temperature of the detector unit to be above 25° C., above 27° C. or even above 30° C.

The method may comprise always applying at least some heat output from

The heater, regardless of measured temperature(s).

Certain embodiments will now be described by way of example only and with reference to the accompanying drawings, in which:

DETAILED DESCRIPTION

Figure 1A:
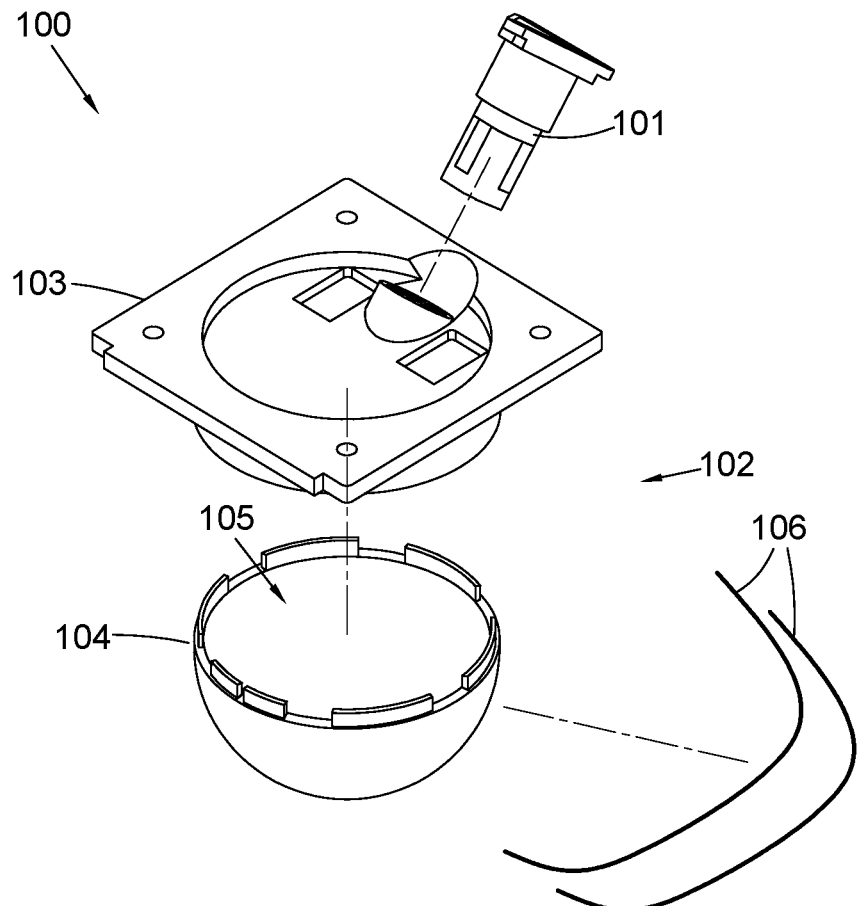
FIG. 1a shows an exploded view of a smoke detector for an aspirating smoke detection system.
Figure 1B:
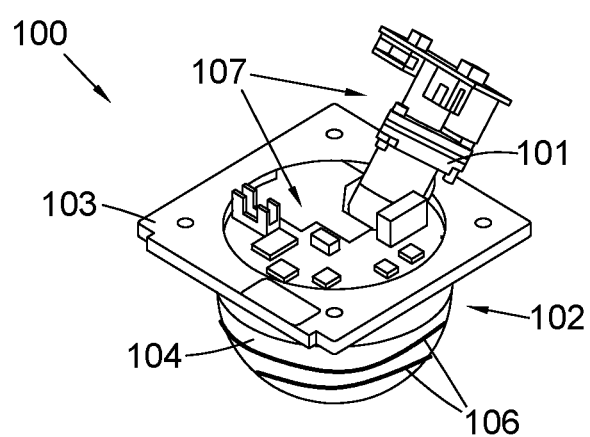
FIG. 1b shows the smoke detector when assembled.

With reference to FIGS. 1a and 1b, a smoke detector 100 is shown.

The smoke detector 100 comprises a housing 102, and an interior of the housing 102 defines a detection chamber 105. The housing 102 in the illustrated embodiment is formed from two parts, comprising a cover part 103 and a dome part 104. The cover part 103 and the dome part 104 are each formed from plastic and have a metallic layer on their inner surface that is reflective and optically exposed to the detection chamber 105.

The dome part 104 is attached to the cover part 103 so that the housing 102 encloses the detection chamber 105 and the detection chamber 105 is optically sealed, preventing any light entering from an outside environment. The respective metallic layers of the dome part 104 and the cover part 103 are in contact with one another at a top edge of the detection chamber 105.

A laser 101 is positioned so as to direct a beam of light through the detection chamber 105. The laser 101 is seated within a recess of the cover part 103 and the head of the laser 101 passes through the cover part 103 into the detection chamber 105.

A light absorber (not shown) is positioned opposite the laser 101 across the detection chamber 105 to receive the beam of light from the laser 101. The light absorber is positioned outside of the detection chamber 105, behind a small hole in the metallic layer of the dome part 104 that allows the passage of light.

A photodetector, such as a photodiode, is positioned at the top of the detection chamber 105 and is set to one side of the light beam, such that the photodetector does not receive light emitted directly by the laser 101, but can detect scattered light from within the detection chamber 105.

The smoke detector 100 operates as a nephelometer in order to detect the presence of smoke particles suspended in air inside of the detection chamber 105 by detecting light scattered in the detection chamber 105. In operation, the laser 101 transmits a beam of light through the detection chamber 105 the hole in the metallic layer of the dome part 104 to the light absorbing receiver positioned opposite the laser 101.

If no smoke particles are present in the detection chamber 105, then substantially all of the light from the laser 101 passes through the hole in the metallic layer of the dome part 104 and is absorbed at the light absorber.

If smoke particles are present in the detection chamber 105, then a portion of the light from the laser 101 is scattered by the smoke particles in the detection chamber 105. Because of the reflective metallic layers of the dome part 105 and cover portion 103 that are optically exposed to the detection chamber 105, the light that is scattered is reflected and the photodetector detects this reflected, scattered light.

As shown in FIG. 1b, control electronics 107 may be installed on the cover portion 103 outside of the detection chamber 105. Upon detection of light by the photodetector above a threshold level, the control electronics 107 of the smoke detector 100 may determine that smoke is present within the detection chamber 105 and an operator may be informed and/or an alarm may be sounded.

The smoke detector 100 further comprises a pair of heating elements 106, such as resistive heating cables or tapes. The heating elements 106 are adjacent to the exterior surface of the dome part 104. In the illustrated embodiment, the heating elements 106 are each laid in a plane around a circumference the dome part 104, and are spaced apart from one another. However, in other embodiments, a single heating element 106 may be used, which may for example follow a spiral path around the dome part 104.

The heating elements 106 may comprise self-regulating heating cables, such as a positive temperature coefficient (PTC) heater, whereby a heating power output of the cable adjusts automatically in response to a temperature of the cable in order to maintain a substantially constant temperature.

In operation, heat output from the heating elements 106 is conducted through the plastic of the dome part 104 and heats the metallic layer of the dome part 104. As a result of the high thermal conductivity of the metallic layers of the cover part 103 and dome part 104, they will maintain a substantially even, heated temperature, which prevents condensation from forming on their reflective inner surfaces.

The metallic layers also conduct heat to the laser 101, and a body of the laser 101 in turn conducts the heat to a lens of the laser 101. This prevents condensation from forming on the lens of the laser 101.

This configuration is advantageous because the most problematic areas for condensation to form in the smoke detector 100 are on lenses of the laser 101 and the inner reflective surfaces (i.e. the metal layers) of the detection chamber 105.

Condensation on the lenses of the laser 101 is problematic because, due to the nanometre wavelengths of light emitted by the laser 101, the condensation can cause refraction of the transmitted light from the laser 101. This can cause light from the laser to be detected as scattered light because it misses the hole to the light absorber and is instead reflected by the metallic layers to the photodetector. This can result in a false detection of smoke.

Condensation on the metallic layers is also problematic as these are designed to reflect light to the photodetector. The presence of condensation on the metallic layers can alter their Fresnel coefficients and reduce the reflection of scattered light. This in turn decreases the sensitivity of the smoke detector 100 when detecting smoke.

By conducting heat from the heating elements 106 to each of these components and heating them to a temperature that is the same as or above an ambient temperature of a monitored space (i.e. the temperature of the air drawn into the smoke detector 100 from a space to be monitored), the formation of condensation on these components can be reduced or prevented as there is no longer a drastic temperature drop between the ambient air temperature and the temperature of these components.

It will be understood that any heating of the above components will reduce the formation of condensation. However, ideally these components are heated to a temperature above a temperature of a space being monitored by the smoke detector 100 (or above an anticipated range of ambient operating temperatures) to prevent the formation of condensation.

Some existing detectors comprise metallic layers such has those described above. In such a smoke detector, heating elements 106 as described above can be retrofitted to make use of the existing metallic layers to conduct heat.

Figure 2:
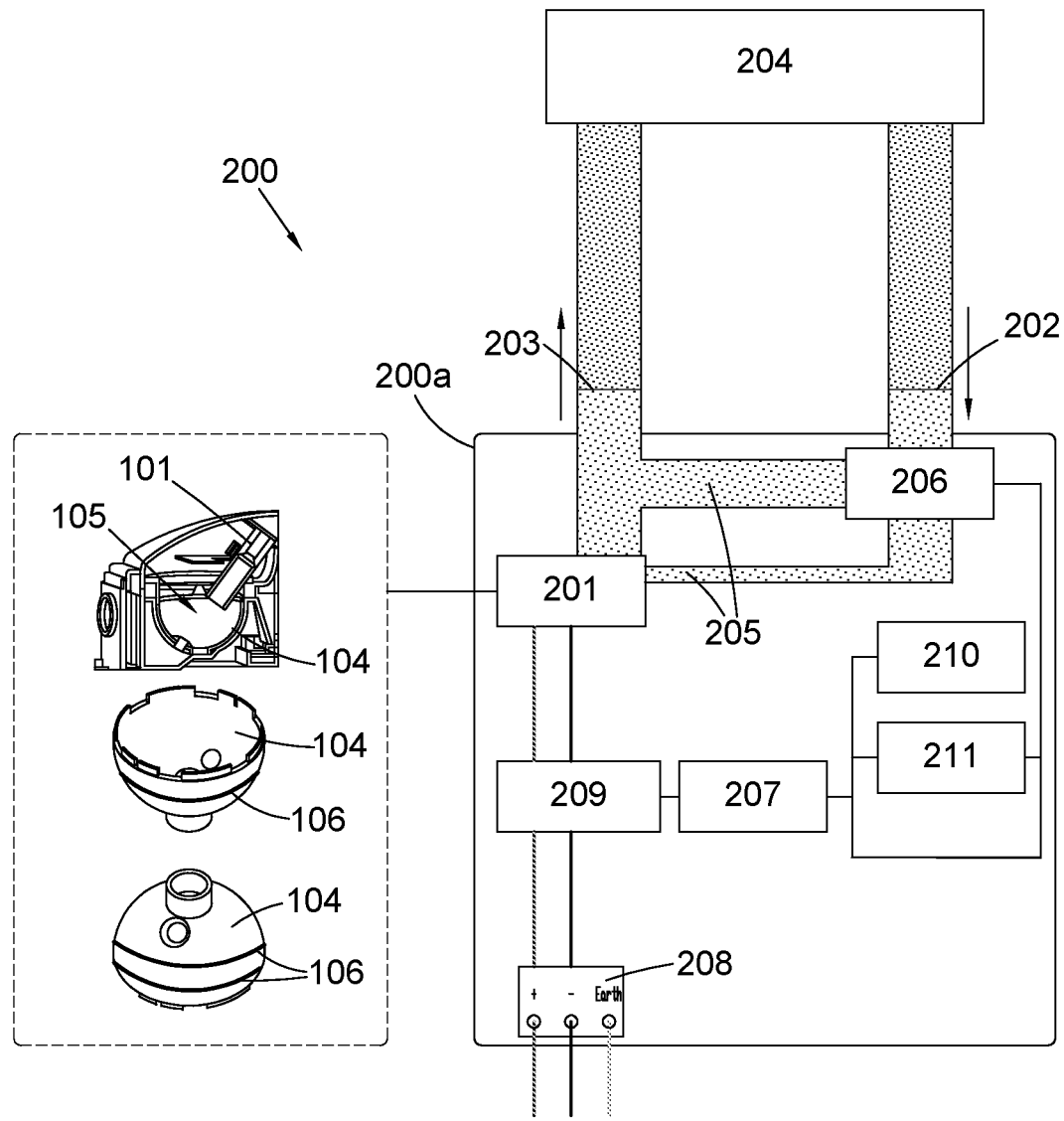
FIG. 2 shows an aspirating smoke detection system comprising the smoke detector.

With reference to FIG. 2, an aspirating smoke detection system 200 is shown. The system 200 comprises a detector unit 200a including a smoke detector 201 similar to that described above in relation to FIGS. 1a and 1b.

A cross-section of the smoke detector 201 is shown on the left hand side of FIG. 2, along with two isometric views of the dome part 104 with the heating elements 106 attached.

The aspirating smoke detection system 200 comprises an inlet 202 and outlet 203 that are fluidly connected to a space to be monitored 204 such as a room via piping around the monitored space. In practice, the detector unit 200a is fitted to the inlet 202 and the outlet 203 in order to connect it to pre-installed piping that goes around the monitored space, thus forming the aspirating smoke detection system 200. This allows for a single design of detector unit 200a to be utilised for a wide range of monitored spaces because the pre-installed piping around the monitored space can be designed for a particular space.

The inlet 202 and the outlet 203 form part of an air flow system that further comprises piping 205 fluidly connecting the inlet 202 to a blower unit 206, the smoke detector 201, and the outlet 203.

The structure and operation of the detector unit 200a of the aspirating smoke detection system 200 will now be described in further detail, with reference to FIG. 2.

The detector unit 200a comprises a power supply unit 208 and a buck boost regulator 209 with overcurrent protection electrically connected to the smoke detector 201 and a controller 207. The power supply unit 208 is arranged to be connected to mains power.

The controller 207 is further connected to indicators 210, an air sensor 211 and the blower unit 206.

In operation, the blower unit 206 draws air into the system 200 from the monitored space 204 via the inlet 202. In order to maintain sufficient suction to draw air from across the entire monitored space 204, the blower unit 206 will typically draw in significantly more air than can be processed by the smoke detector 201. Therefore, typically about 10 to 15% of the air from the blower unit 206 is diverted to the smoke detector 201 to be tested for the presence of smoke, with the remainder of the air being sent directly to the outlet 203.

The portion of air diverted to the smoke detector 201 contains a range of air samples taken from the full flow. The remainder of the air and the diverted portion of air after it has been tested are eventually returned to the space to be monitored 204 via the outlet 203.

Power is supplied to the smoke detector 201 and the controller 207 from the power supply unit 208 via the buck boost regulator 209. The buck boost regulator 209 functions to protect against overcurrent and ensures a stable power supply to the smoke detector 201 and the controller 207. Power supplied to the smoke detector 201 is used by the laser 101, the heating elements 106 and the photodetector.

The air sensor 211 measures a flow rate through the inlet 202. The air sensor 211 also measures the temperature of the air entering the inlet 202. These measurements are all received by the controller 207.

The heating elements 106 are self-regulating as mentioned above in order to maintaining a substantially constant temperature of the smoke detector 201, ideally a temperature above the expected operating air temperature ranges of the system. For example, if the space to be monitored 104 is an office space having a typical temperature of about 25° C., the heating elements 106 may be arranged to maintain a temperature of about 30° C.

The heating elements 106 may also comprise a temperature sensor that measures the temperature of the heating elements, the dome portion 104 or the metallic layers, where the measured temperature is received by the controller 207. The controller 207 may adjust the heat output of the heating elements 106 based at least in part on any of the rates of air flow or any of the measured temperatures described above.

What is claimed is:

1. A smoke detector unit for an aspirating smoke detection system, the detector unit comprising:
    a housing that defines a detection chamber, wherein the housing comprises a metallic layer optically exposed to the detection chamber;
    a laser arranged to direct a beam of light through the detection chamber;
    a photodiode arranged to detect light scattered from the beam of light, wherein the metallic layer is arranged to reflect light that is scattered from the beam of light to the photodiode;
    a light-absorbing receiver arranged to receive light from the laser that is not scattered from the beam of light; and
    a heater positioned proximate the metallic layer and outside of the detection chamber, wherein the metallic layer is configured to conduct heat from the heater.

2. A smoke detector unit as claimed in claim 1, wherein the metallic layer and laser are configured to conduct heat from the heater to a lens of the laser in order to prevent or reduce the formation of condensation on the lens of the laser and/or on the metallic layer.

3. The smoke detector unit as claimed in claim 2, wherein the metallic layer is configured to conduct heat from the heater to the light-absorbing receiver in order to prevent or reduce the formation of condensation at the light-absorbing receiver.

4. A smoke detector unit as claimed in claim 1, wherein the heater comprises at least one heating cable or tape.

5. A smoke detector unit as claimed in claim 1, wherein the heater is configured to self-regulate its heating output.

6. A smoke detector unit as claimed in claim 1, wherein the metallic layer is configured to conduct heat from the heater to the light-absorbing receiver in order to prevent or reduce the formation of condensation at the light-absorbing receiver.

7. A smoke detector unit as claimed in claim 1, comprising an indicator, wherein the indicator is arranged to indicate to a user any one or a combination of the following:
    a measured temperature of the detector unit, the heater and/or air in the detection chamber;
    a heat output of the heater;
    a presence of condensation in the detector unit;
    a presence of smoke in the detection chamber; and/or
    a rate of air flow through the detection chamber.

8. A smoke detector unit as claimed in claim 1, comprising a buck boost regulator with overcurrent protection, wherein the detector unit is arranged to receive power through the buck boost regulator.

9. A smoke detector unit as claimed in claim 1, further comprising a blower arranged to draw an air flow into the detector unit.

10. A smoke detector unit as claimed in claim 9, wherein only a portion of the air flow is diverted to the detection chamber of the detector unit.

11. A smoke detector unit as claimed in claim 10, wherein the portion of air flow that is diverted to the detection chamber is 50% or less of the total air flow drawn from the space to be monitored, preferably 25% or less, more preferably 20% or less and even more preferably 15% or less.

12. An aspirating smoke detection system comprising:
    a smoke detector unit including
        a housing that defines a detection chamber, wherein the housing comprises a metallic layer optically exposed to the detection chamber;
        a laser arranged to direct a beam of light through the detection chamber;
        a photodiode arranged to detect light scattered from the beam of light, wherein the metallic layer is arranged to reflect light that is scattered from the beam of light to the photodiode;
        a light-absorbing receiver arranged to receive light from the laser that is not scattered from the beam of light; and
        a heater positioned proximate the metallic layer and outside of the detection chamber, wherein the metallic layer is configured to conduct heat from the heater; and
    piping arranged to direct an air flow from a monitored space to the detector unit.

13. A method of reducing or preventing the formation of condensation within a detector unit of an aspirating smoke detection system, the method comprising:
    applying heat from a heater to a metallic layer of a detection chamber of the detector unit in order to reduce or prevent the formation of condensation on one or both of the metallic layer and a lens of a laser of the detection unit;
    wherein the detector unit is a smoke detector unit including:
        a housing that defines a detection chamber, wherein the housing comprises a metallic layer optically exposed to the detection chamber;
        a laser arranged to direct a beam of light through the detection chamber;

a photodiode arranged to detect light scattered from the beam of light, wherein the metallic layer is arranged to reflect light that is scattered from the beam of light to the photodiode;

a light-absorbing receiver arranged to receive light from the laser that is not scattered from the beam of light; and a heater positioned proximate the metallic layer and outside of the detection chamber, wherein the metallic layer is configured to conduct heat from the heater.

* * * * *